Feb. 23, 1943. W. E. GARITY 2,312,158
APPARATUS FOR USE IN PHOTOGRAPHING MINIATURES
Filed April 24, 1942 2 Sheets-Sheet 1

WILLIAM E. GARITY,
INVENTOR.
BY
ATTORNEY.

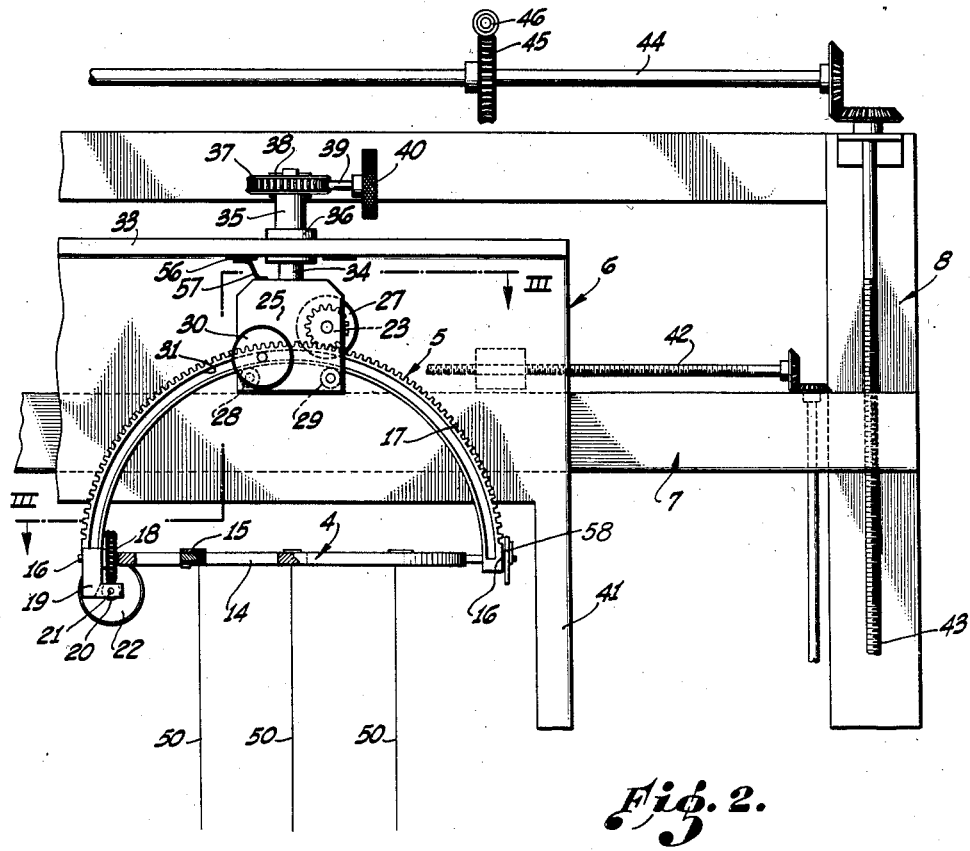
Fig. 2.
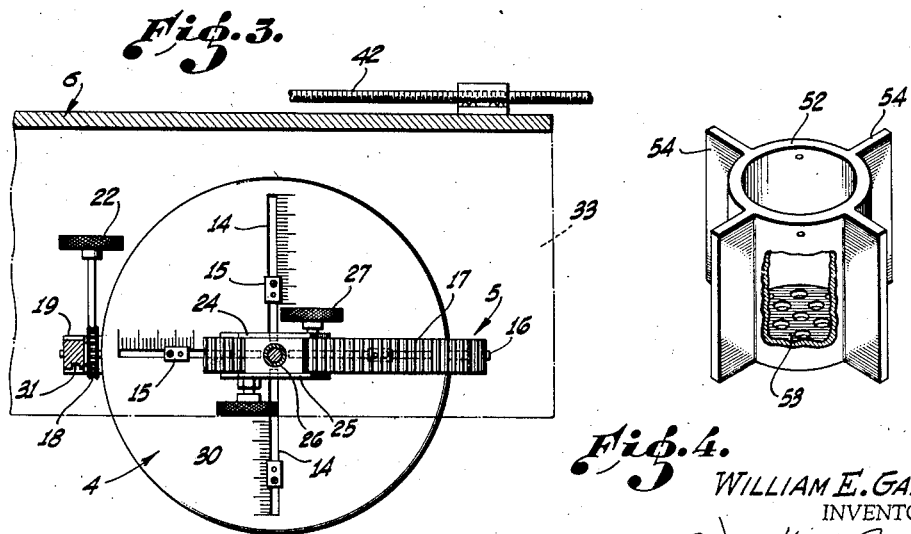
Fig. 3.
Fig. 4.
WILLIAM E. GARITY, INVENTOR.
BY
ATTORNEY.

Patented Feb. 23, 1943

2,312,158

UNITED STATES PATENT OFFICE 2,312,158

APPARATUS FOR USE IN PHOTOGRAPHING MINIATURES

William E. Garity, Los Angeles, Calif., assignor to Walt Disney Productions, Burbank, Calif., a corporation of California Application April 24, 1942, Serial No. 440,325

10 Claims. (Cl. 46—77)

This invention pertains to an apparatus for use in the photography of miniatures and is particularly directed to devices and arrangement of elements for use in the production of motion pictures in which miniatures are employed.

In many educational films and photoplays, situations need be depicted which cannot be readily photographed in their natural or actual form. Occasionally it is desirable to pictorially depict a situation or sequence of acts which are fantastic, exaggerated, or which would only occur in times of war or under conditions which would place the actors as well as the cameraman in extreme danger. In order to obtain a photographic record of such sequences or incidents, recourse has been had to the use of miniatures, scale models, dummies and the like, these miniatures being then manipulated by means of wires or other suspension elements to give them the desired movement. The movement and positioning of such miniatures has been fraught with many difficulties and it has been found virtually impossible to impart a smooth, natural movement to miniatures. As a result, the enlarged image, when projected upon the screen, has, in many instances, moved vertically or unnaturally and for this reason detracted from the impression of realism which the photographer or producer intended to create.

The present invention is primarily directed to an apparatus whereby miniatures may be moved, adjusted and positioned during photography (or between periods of photographic exposure when the stop motion method of photography is employed) so that the impression of realism may be effectively maintained. The apparatus of the present invention obviates the oscillation of suspended miniatures and permits accurate control of the movement of the miniatures.

In accordance with the present invention, means are provided for suspending or holding a miniature in the photographic field of a camera by means which are not recorded upon the film, the suspending elements (and sometimes the miniature itself) being immersed in or in contact with a viscous liquid which acts as a dampening agent.

It is an object of the present invention, therefore, to disclose and provide means and methods of facilitating the photography of miniatures.

A further object of the present invention is to disclose and provide an apparatus whereby the movement of miniatures within the field of view of a camera may be regulatably controlled.

A still further object of the invention is to disclose and provide means of suspending and adjustably positioning miniatures and the like without prolonged oscillation thereof.

These and other objects of the present invention will become apparent to those skilled in the art from the following description of certain exemplary forms of the invention described hereinafter and illustrated in the appended drawings, wherein:

Fig. 2 is a front elevation of the apparatus employed in the arrangement shown in Fig. 1.

Fig. 3 is a horizontal section along the broken plane III—III through Fig. 2.

Fig. 4 is an enlarged perspective view of one form of stabilizer which may be employed.

While the present invention is adapted for use with miniatures of various types and characteristics, such as for example, miniature vehicles moving along supporting surfaces, the greatest field of usefulness lies in the adaptation of the present invention to miniature airplanes or other objects adapted to move in more than one plane. For example, it is often desired to depict the movements of an airplane in flight and since the photography of an actual airplane performing desired maneuvers is often difficult, recourse is had to the use of miniatures. Educational films illustrating proper flight, aerial maneuvers, bombing procedures and the like, are best made by the use of miniatures. As previously stated, however, the accurate control of the position and movement of these miniatures is difficult and any object, such as a scale model of an airplane, when suspended from the fine wires ordinarily used, tends to move or oscillate while in suspension, displacing successive images taken on a strip of motion picture film to such an extent that when such film is projected during reproduction the highly magnified or enlarged image on the screen is blurred, jerky and unsatisfactory from the standpoint of realistic reproduction of the desired movement or maneuver. The present invention, however, obviates these difficulties and permits careful, accurate and controllable positioning of any miniature object in a desired attitude or succession of attitudes without undesired oscillation or displacement from a predetermined position.

Figure 1:
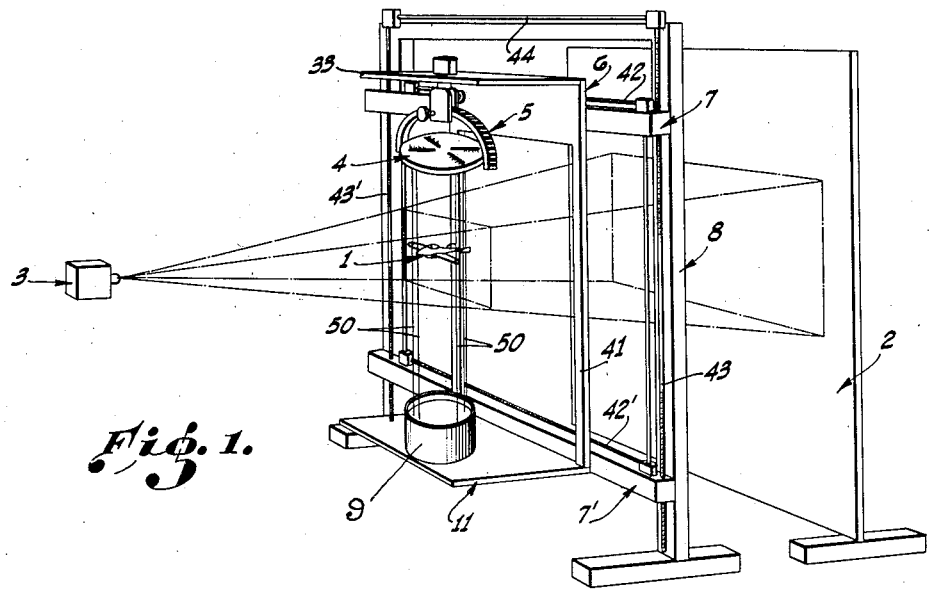
Fig. 1 is a perspective view of one arrangement employing the present invention.

Fig. 1 illustrates one arrangement which may be employed in accordance with the present invention and is particularly directed to the step of photographing a miniature of an airplane 1 before a suitable background 2 (which may be an enlarged photograph of clouds, a view of a given objective or target or other suitable background, depending upon the action to be depicted). The background 2 may be projected upon a screen located in the plane 2 by means of a projector suitably positioned not shown in the drawings. The model or miniature 1 may be photographed by means of a motion picture camera 3 mounted upon a suitable bed or carriage, whereby the camera 3 may be moved toward or away from the background 2 and if the action so requires, means may be provided whereby the camera 2 may be rotated about its optical axis. Mounting arrangements permitting rotation of a camera on an axis either coincidental with the axis of the camera lens or parallel thereto are available in the art.

The miniature 1 may be suspended by a plurality of suspension elements attached to a suspension plate 4 which is capable of being tilted about an axis lying in the plane of the plate 4. The suspension plate 4 may be carried by a semicircular member 5 whereby the plate 4 may be tilted or pivoted about another axis at right angles to the first-mentioned axis. The entire assembly may then be mounted for movement about a third axis at right angles to the last-mentioned axis, the three axes of rotation intersecting in the suspension plate 4. The means herein described may then be attached to a carriage generally indicated at 6 and means may be provided for moving the carriage 6 horizontally as upon the cross-heads 7. The cross-heads may in turn be adjustably positionable upon the outer frame 8.

From this general description it will be evident that the miniature 1 can be moved vertically or horizontally and may also be caused to assume any desired angular position by changing the position of the suspension plate 4. In order to obviate or inhibit oscillation of the miniature 1, the suspension elements extend downwardly from the miniature 1 into a body of viscous liquid within a container 9 carried by a bracket 11 attached to the carriage 6. The ends of the various suspension elements are provided with stabilizers which, being immersed in the viscous liquid, can be moved through such liquid, but will not oscillate, instead dampening any oscillation, accidental or otherwise, set up in the miniature 1.

By referring to Figs. 2 and 3, it will be noted that the suspension plate 4 is provided with a plurality of radially extending slots 14, suitable indicia being placed adjacent each slot for the purpose of facilitating the placement of adjustable holders 15 which are adjustably positionable along each slot. The holders 15 are adapted to receive the suspension elements, such as, for example, fine piano wire, by means of which the miniature 1 is held within the field of view of the camera 3. In most instances, it is desirable that a miniature such as that of an airplane be held by four suspension elements and since most objects, such as an airplane, are symmetrical about longitudinal axes, the suspension wires passing through the wings of the miniature should be equally spaced from the center of the plate 4. Similarly, the longitudinally spaced suspension wires are preferably equally spaced from the center of the plate 4.

The suspension plate 4 may be mounted for rotation about an axis passing therethrough such as, for example, the axis established by trunnions 16, journaled in diametrically opposed portions of semi-circular pinion gear 17. The trunnions 16 may be provided with a worm wheel 18 and the bracket 19 attached to the lower end of the pinion gear 17 which may be provided with a worm 20 carried by a shaft 21 provided with a knurled knob or actuating handle 22. Rotation of knob 22 will cause the suspension plate 4 to tilt about the axis extending through the trunnions 16.

The means for tilting the suspension plate 4 about another axis at right angles to the first-named axis may include a worm or small pinion 23 adapted to engage the teeth of the pinion 17, the worm 23 being mounted upon a shaft journaled in side plates 24 and 25 maintained in suitable spaced relation by means of a head provided with a vertical bore 26. The shaft upon which the worm 23 is mounted may be provided with an adjustment knob or actuating handle 27. The pinion gear 17 may be supported between the members 24 and 25 upon rollers 28 and 29. One of the side members 24 may also be provided with a positioning knob 30 carried by one end of a bolt threaded in the side member 24, the bolt being provided with a dog or pivot point extending into a groove 31 formed in the side of the pinion gear 17, whereby the pinion gear may be firmly held in position between the members 24 and 25. When the locking knob 30 is loosened, actuation of the knob 27 will cause the pinion gear 17 to travel over the rollers 28 and 29, thereby tilting the plate 4 about an axis coincidental with the center of the pinion gear 17, such center intersecting the trunnion axis 16 in the plate 4.

The device described so far may be pivotally suspended from the supporting bracket 33 so as to move about a vertical axis intersecting the previous intersection of axes. The bracket 33 may, for example, be provided with a spindle sleeve 34 carried by the lower side of the bracket 33. The spindle sleeve 34 may be rotatably received within the bore 26, a stepped shaft 35 extending through the bracket and sleeve 34 and being attached to the head connecting the side members 24 and 25. The stepped shaft 35 may rest on stop bearings 36 and be provided with a worm wheel 37 in engagement with a worm 38 carried upon a shaft 39 provided with the adjustment knob or handle 40. It will be evident that rotation of the knob will cause rotation of the stepped shaft 35 and pinion gear 17 about a vertical axis, whose extension intersects the previously described axis of rotation at their point of intersection in the plate 4.

The bracket 33 is a part of the carriage 6, said carriage including downwardly extending side members 41 connected at the bottom by the bracket 11. The carriage 6 is suspended from the cross-head 7 and horizontal motion may be imparted to the carriage 6 by means of a driven, externally threaded shaft 42 carried by the cross-head 7, the threaded shaft 42 engaging a nut or nuts mounted upon the carriage 6. The threaded shaft 42 may be driven in any suitable manner and if desired, the companion parallel shaft may be mounted upon the lower cross-head 7′, the shafts 42 and 42′ then being driven in unison by any suitable means, such as for example, an interconnecting shaft and pinion gears or worms. The two cross-heads 7 and 7' may be simultaneously raised or lowered upon the framework 8 as by means of vertically extending threaded shafts 43 and 43', one of the shafts being provided with a right hand thread and the other with a left hand thread. The upper member of the frame 8 may be provided with a cross shaft 44 having worm wheel 45 and a driven worm 46. The ends of the shaft 44 may be provided with mitre gears in engagement with appropriate mitre gears carried by the ends of the threaded shafts 43 and 43'.

The lower bracket 11 supports a container or open topped receptacle 9, filled with a relatively viscous liquid, such as for example, a lubricating oil, the lower end of each suspension element, such as the wire 50, being provided with a stabilizer of sufficient weight to maintain the suspension element under tension. One form of suspension element is illustrated in Fig. 4, and as there shown may comprise a cylindrical body portion 52 having a foraminous, venticulated or perforated bottom 53 and a plurality of outstanding vanes 54. The vanes 54 retard rotation of the stabilizer within the body of viscous liquid and to some extent resist rapid movement of the stabilizer through the liquid in a horizontal direction. Vertical movement of the stabilizer in the body of liquid is retarded by the foraminous bottom 53.

It will be evident from the description given hereinbefore that means have been provided for regulatably moving the suspension plate 4 about axes intersecting in the plane of the plate and for moving the entire apparatus both horizontally and vertically. As a result, any object, such as the airplane 1, carried by the suspension elements 50 may be placed in substantially any desired position within the field of view of the camera 3 and in front of the background 2.

When stop motion photography is employed the miniature may be moved to a new position between one or more periods of exposure, thereby giving rise to a motion picture which, when projected, gives the effect of constant motion. In order to control the increments of movement imparted to the miniature between successive exposures, indicia may be provided whereby the degree of movement can be accurately determined. For example, an annular ring 56 divided into 360 degrees may be fastened to the lower surface of the bracket 33, the rotating head carried by the lower end of shaft 35 being provided with an index 57 adapted to cooperate with the annular graduated ring 56. The side member 24 may be similarly provided with a dial surrounding the shaft upon which the adjustment knob 27 is mounted, the shaft carrying an index finger cooperating with such dial and thereby indicating the angular position of the pinion gear 17. A dial 58 may be carried by one end of the pinion gear 17, such dial being in close proximity to an index finger carried by the trunnion 16 so as to indicate the angular position of the suspension plate 4 about the trunnion axis. By these means the rate of progressive change between exposures may be varied to a predetermined and desired manner.

Although manual controls for the various movements have been shown, it is to be understood that motor drives may also be employed, thereby permitting remote control of the various adjustments. Moreover, various electrical control circuits may be used so as to cause the adjustments to take place in a predetermined and progressive manner simultaneously. Those skilled in the electrical arts will readily adapt electrical controls to the devices herein disclosed.

Figure 5:
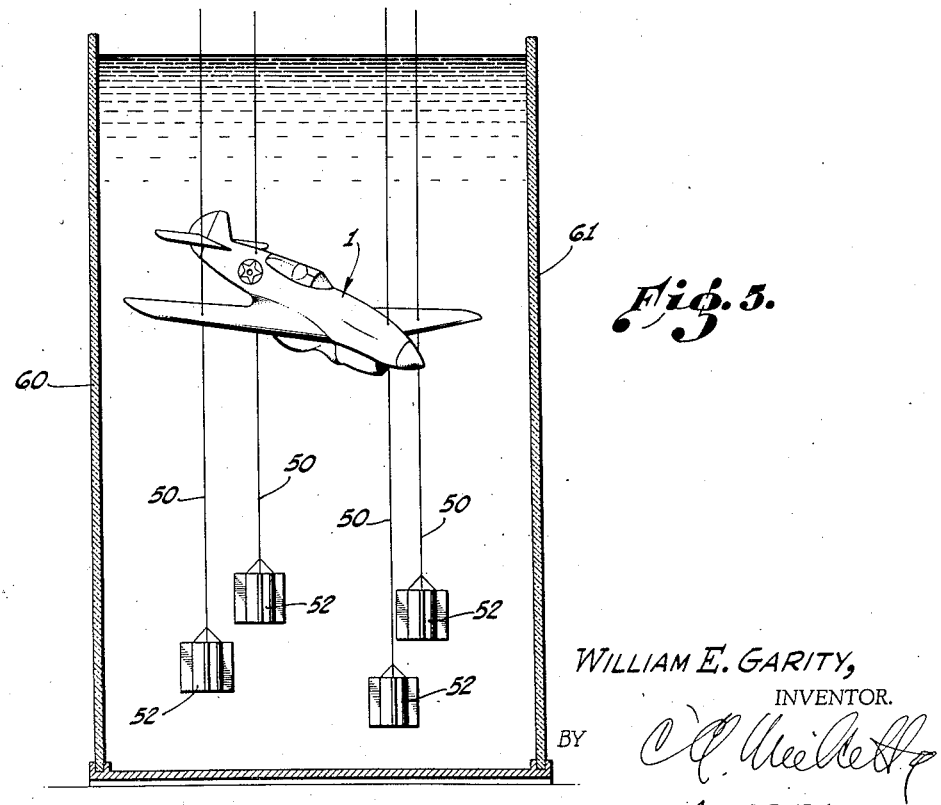
Fig. 5 is a side view of a portion of a modified form of apparatus.

In the modification illustrated in Fig. 5, the entire miniature is positioned within a container having transparent front and rear walls 60 and 61. The container having these transparent walls is then filled with a suitable liquid, preferably transparent, the miniature as well as the stabilizing elements being thus immersed in the transparent liquid which exerts a dampening effect on any oscillations or vibrations which may be set up in the miniature. Highly refined petroleum oils are well adapted for use in this modified arrangement. Moreover, by immersing the entire miniature into a body of substantially transparent, preferably viscous liquid it is possible to use substances such as strips of Celluloid, Cellophane or ribbons or thread made of Nylon and other substantially transparent materials, which, upon immersion in the transparent liquid or oil, become invisible to the lens of the camera. Photography of the miniature takes place through the transparent wall of the cell in which the miniature is thus located.

I claim:

1. An apparatus for use in the photography of miniatures comprising: a suspension plate; means for controllably moving said plate; a plurality of spaced suspension elements attached to said plate and depending therefrom; an object to be photographed attached to said suspension elements; a weighted stabilizer carried by the lower end of each of said elements and a body of viscous liquid in contact with said stabilizer whereby oscillation of the object is minimized.

2. An apparatus for use in the photography of miniatures comprising: a suspension plate; means for controllably moving said plate; a plurality of spaced suspension elements attached to said plate and depending therefrom; an object to be photographed attached to said suspension elements; a weighted stabilizer carried by the lower end of each of said elements; a body of viscous liquid in contact with said stabilizer whereby oscillation of the object is minimized and means for moving said plate and body of liquid vertically and horizontally.

3. An apparatus for use in the photography of miniatures comprising: a suspension plate; means for controllably moving said plate about axes intersecting in the plane of the plate; a plurality of spaced suspension elements attached to said plate at points radially spaced from such point of intersection of axes and depending from such spaced points; an object to be photographed attached to said suspension elements; a weighted stabilizer carried by the lower end of each of said elements and a body of viscous liquid in contact with said stabilizer whereby oscillation of the object is minimized.

4. An apparatus for use in photographing miniatures comprising: a suspension plate, means for controllably moving said plate about axes intersecting in the plane of the plate; a plurality of spaced suspension elements attached to said plate and depending therefrom; an object to be photographed carried by said suspension elements; a weighted stabilizer carried by the lower end of each of said suspension elements; and a container provided with transparent walls surrounding said object and weighted stabilizers, said container being adapted to receive a transparent liquid.

5. In apparatus of the character defined in claim 1 wherein each of the weighted stabilizers comprises a cylinder with a perforated transverse partition and radially extending vanes.

6. An apparatus of the character defined in claim 4 wherein each of the weighted stabilizers comprises a cylinder with a perforated transverse partition and radially extending vanes.

7. An apparatus of the character defined in claim 4 wherein the suspension plate is mounted upon a carriage and means are provided for moving the carriage and container vertically and horizontally.

8. An apparatus for use in the photography of miniatures comprising: a carriage; a suspension plate pivotally mounted thereon, said suspension plate being provided with radially positionable means for holding suspension elements; controllable means for tilting the plate about an axis; separate controllable means for tilting the plate about an axis at right angles to the first-named axis; means for turning said plate about an axis at right angles to the last-named axis; an object to be photographed carried by a plurality of suspension elements held by said plate and a weighted stabilizer attached to the lower end of each of said suspension elements.

9. An apparatus of the character defined in claim 8, including a container positioned beneath the suspension plate and object to be photographed, said container being adapted to receive a body of viscous liquid and said weighted stabilizers.

10. An apparatus of the character defined in claim 8, wherein said suspension plate is provided with radially extending slots adjustably receiving the suspension element holding means, a container for viscous liquid mounted upon the carriage and beneath said plate and adapted to receive the weighted stabilizers and means for moving said carriage vertically and horizontally.

WILLIAM E. GARITY